Aug. 12, 1930.   C. RUSSELL   1,772,638
SCALING AND GRADING INSTRUMENT
Filed May 29, 1928   3 Sheets-Sheet 1

Fig. 1 OBVERSE

MECHANICAL SCALER AND GRADER

M-SCALE

ACHIEVEMENT RATIO SCALE

DIRECTIONS FOR FINDING
M-SCALE SCORES

1 PLACE THE RAW SCORES FROM
2 NUMBER THE BEST
3 IF THERE
4 INSERT
5 READ

CAUTIONS

1 WHEN
2 WHEN
THE BLACK LINES INDICATE QUARTILES SO THAT

DIRECTIONS FOR FINDING
LETTER GRADES

1 PLACE
2 GIVE EACH
3 INSERT
4 DRAW
5 READ

CAUTIONS

1 WHEN
2 IF
THE BLACK LINES

M-SCALE

ACHIEVEMENT RATIO SCALE

Fig. 2 REVERSE

MECHANICAL SCALER AND GRADER

LETTER GRADES SYSTEM 10.1

B-SCALE

DIRECTIONS FOR FINDING
ACHIEVEMENT RATIOS 1
2
3
4
5

USES 1
2
3

DIRECTIONS FOR FINDING
B-SCALE SCORES 1
2
3
4
5

USES 1
2
3

LETTER GRADES SYSTEM NO. 1

B-SCALE

Witness
Frederick S. Greenleaf

Fig. 3

Inventor
Charles Russell
By his attorneys
Van Evera Fish Hildreth & Cary

Aug. 12, 1930.                    C. RUSSELL                    1,772,638
                         SCALING AND GRADING INSTRUMENT
                    Filed May 29, 1928          3 Sheets-Sheet 2

Patented Aug. 12, 1930

1,772,638

UNITED STATES PATENT OFFICE

CHARLES RUSSELL, OF WESTFIELD, MASSACHUSETTS, ASSIGNOR TO GINN AND COMPANY, A COPARTNERSHIP, OF BOSTON, MASSACHUSETTS

SCALING AND GRADING INSTRUMENT

Application filed May 29, 1928. Serial No. 281,475.

The present invention relates to an improvement in scaling and grading instruments for scaling and grading classroom tests for schools.

When teachers mark tests given their pupils the results are called "raw scores." In and of themselves any one raw score is meaningless except with relation to the several scores gained by the class because it is impossible, except through the use of standard tests, (and then only in a few cases), to determine the zero point of any particular scale of achievement. In and of themselves these raw scores are not comparable with scores for the same group derived from other tests because the amount, meaning and size of the units change, although the name for the various units remains the same. Thus, a score of 20 on one test may mean equivalent achievement to a score of 70 from another paper from another test, where the names of the units (numbers) are the same, but where the size or character of the units has been differently determined.

A technic has been developed whereby it is possible to transpose these raw scores into scores which are meaningful when taken either with respect to one individual or many, and whereby the scores for a single individual in two or more tests may be made comparable. This allows for adding the scores together directly, dividing the result by the number of tests involved, which leaves an average score of the several tests in which all of the entering elements are comparable to each other as well as to the final average.

The technic involves transporting all of the scores on a single test, or on several tests, into scores on the same scale. A scale which has come into use for this purpose is called the "M-scale," which is simply a scale based upon plus and minus 5 S. D. This is a statistical method of expressing variability, being an abbreviation for the words "standard deviation," or, as the unit is sometimes called, "the mean score deviation." It is much used in statistics as a measure of variability. When used in scaling tests the name "M-scale" has been applied to it. (See "Classroom Tests," a handbook on the construction and uses of non-standard tests for the classroom teacher by the present inventor, published by Ginn & Company, 1926.)

The formula for finding an M-score from a raw score is as follows:—The number of pupils exceeding any given score, plus onehalf those reaching that score, is equal to a given percentage of all the pupils involved. This percentage (indicating a volumetric relativity of any particular score to all of the class scores below that score) is quickly transposable into M-score units by means of a table of percentages and values based upon the plus and minus 5 S. D. scale. (See "Classroom Tests," Table XXI, p. 276). Although this method of transposing raw scores into M-scores is extremely valuable, the arduousness of the computations involved forbids its frequent use except by the most conscientious and energetic teachers. A device, therefore, which could accomplish the same results in mechanical fashion would be a saver of time for many teachers, would reduce the error in calculation, would clarify and correct the judgment of teachers, and would make the technic available for many more teachers than can or now will use it. Such a device is possible because it needs only to depend upon the relative placement of raw scores, and not upon their actual size.

One object of the invention is to produce a scaler and grader adapted to transform raw scores into M-scale scores.

In many schools the grades of pupils are expressed by letters. By ordinary methods of determination, these letter grades vary in meaning from teacher to teacher and class to class. "A" may mean superior work, "B" may mean good work, and so on, but no two teachers quite agree as to what are the upper and lower limits within a class of the groupings. For example, with one teacher an individual, because of this variability of opinion, may have ten times as much chance of receiving an "A" as with another teacher, and yet be doing equivalently good work. It has now become the practice to standardize these grades by admitting that the grades are not absolute determinations with respect to the subjects involved, but rather relative determinations of the pupils involved. This means that a grade of "A" must indicate not an instructor's opinion of a grade of work, but rather the quality of achievement of a given proportion of the class. The process of determining the grades by this system is first to select a given proportion, and then second to calculate from all the scores on tests or other judgments of recitations, assignments and the like, the proportion which should receive the "A," "B," "C," etc. The first part of the process depends upon several factors, and may have many variations. The usual procedure is to lay out on a curve of normal distribution five equidistances on the base line, to project these points through the curve, and from that to calculate the proportional amounts of the curve thus cut off by each section of the base line. The end points of the curve, since theoretically it has no ends, are determined arbitrarily by the length of the five base-line sections. This allows many different systems to be used, all based upon the normal curve. (See "Classroom Tests" Fig. 10, p. 214.)

A second object of the invention is to produce a scaler and grader by which the raw scores may be transposed into letter grades.

When the ability of a pupil can be determined by an intelligence test (or other standard test that has a high correlation with intelligence or ability) it becomes possible to find a single rating of effort called the "achievement ratio." The achievement ratio is determined by forming a ratio, both terms of which must be in the same units, and of which the numerator is a rating of educational achievement, and the denominator is a rating of mental achievement. When the result is equal to unity (that is, when the rating of educational achievement is equal to the mental ability), the achievement of the pupil is satisfactory. When it is less than unity, the achievement is shown to be less than satisfactory, and when it is more than unity the pupil has done more than his ability would warrant, and he should be restrained.

M-scale scores make a convenient rating to be used because M-scores, comparable as described above, can be gotten both for mental and educational ratings (see "Classroom Tests" pp. 283, et. seq.) The process is as follows:—(1) to give an intelligence test, or other test which has a high correlation with intelligence; (2) to place the raw scores in rank order, best score first; (3) to M-scale the raw scores (which results in a standard M-score which the pupil should equal or exceed in each of his educational tests); and (4) M-scale the raw scores from educational tests. With the results in hand of the above operations, a set of M-scale ratings for intelligence for a group of pupils and a set of M-scale ratings in a unit of educational subject matter for the same group of pupils, achievement ratios can be found by computing the ratio of educational achievement to mental achievement. This laborious task, however, may be performed easily and quickly by the device of the present invention, a third object of which is to produce a device for computing achievement ratios from M-scale ratings of intelligence and M-scale ratings of mental achievement.

Although achievement ratios are in quite general use among teachers, particularly when standard tests are used, a somewhat more desirable rating has been developed which may replace the achievement ratio. This rating is called an "effort score," and its value lies in the fact that it is a rating similar in quality to the M-scale score. The effort score is found by adding 50 to the M-score of educational rating, and subtracting from the result the M-score of the mental rating. When the effort score has been found, if it lies about 50 the pupil can be considered as doing better work than one might expect from one of this ability. When it lies below 50, regardless of how good work the pupil might be doing, it shows that he is doing less than he should. An effort score of 50 is satisfactory. In actual experience one may expect a certain amount of variation. A fourth object of the invention is to produce a device for calculating effort scores which are, for convenience, named "B scores."

It so happens that some classes of pupils vary from the normal curve in the distribution of their ability. The reasons for the variation are many. Whatever the reason or reasons, the curve of ability for many classes of pupils is that of a minus skew curve, wherein the high point of the curve is thrown to the right, where there is a larger proportion of pupils of higher than of lower ability (see "Classroom Tests" Fig. 11, p. 215).

Another object of the invention is to provide a device for use in connection with computations based on various forms of minus skew curves, as well as upon various forms of normal curves.

To these ends the present invention consists in the scaling and grading instrument hereinafter described and particularly defined in the claims.

In the accompanying drawings illustrating the preferred form of this invention.

Figure 1:
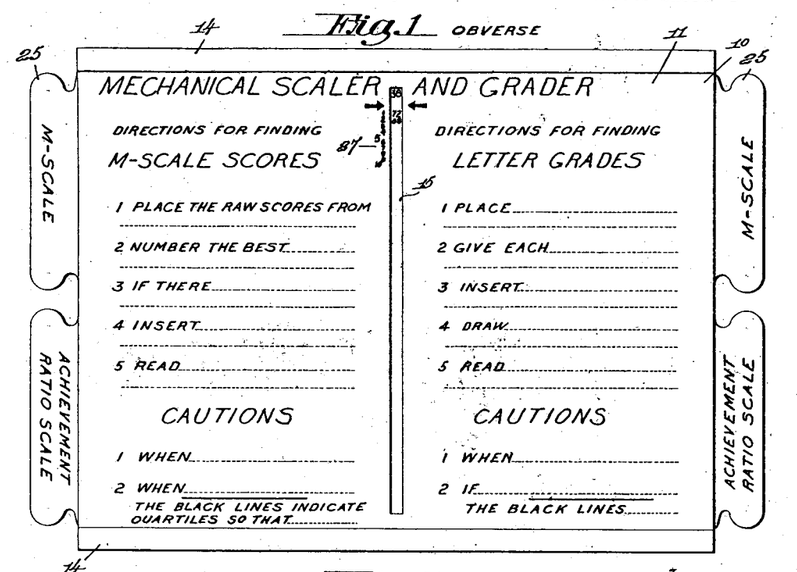
Fig. 1 is a plan of the obverse side of the instrument.
Figure 2:
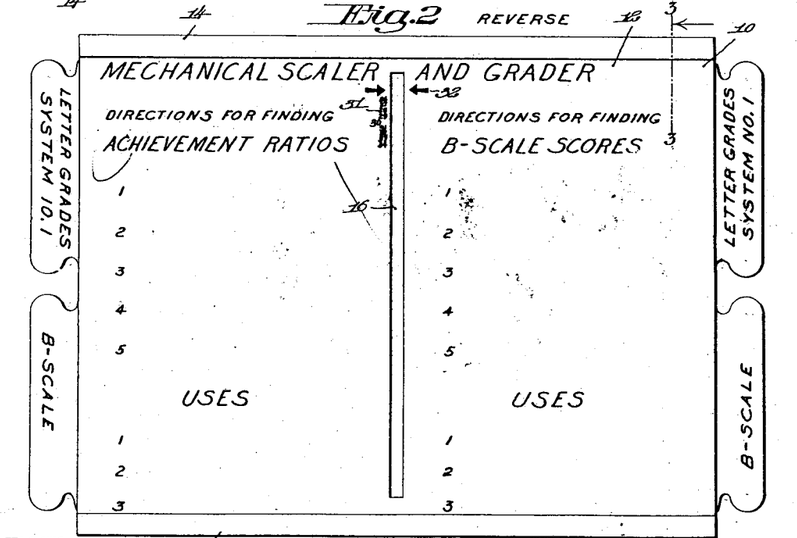
Fig. 2 is a plan of the reverse side.
Figure 3:
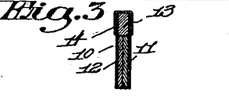
Fig. 3 is a sectional view taken on the line 3—3, Fig. 2.

The illustrated embodiment of the invention is described as follows: The instrument consists of a holder provided with one or more slides. The holder proper 10 consists of an obverse face 11 and a reverse face 12, having between their top and bottom edges spacers 13 and a binder 14. The top and bottom edges of the faces are conveniently made of binders' board, the spacer of wood, and the binder 14 of cloth, all being glued firmly together. This leaves a space between the two faces to receive slides, in this instance two in number. Both faces 11 and 12 are provided in the center with slots or apertures 15 and 16. On the left of the slot on the obverse side of the scale 10 are printed the directions for finding M-scale scores, and on the right are printed directions for finding letter grades. On the left hand side of the reverse face are printed the directions for finding achievement ratios, and on the right hand side of the reverse face are printed the directions for finding the B scales or effort scores.

Figure 4:
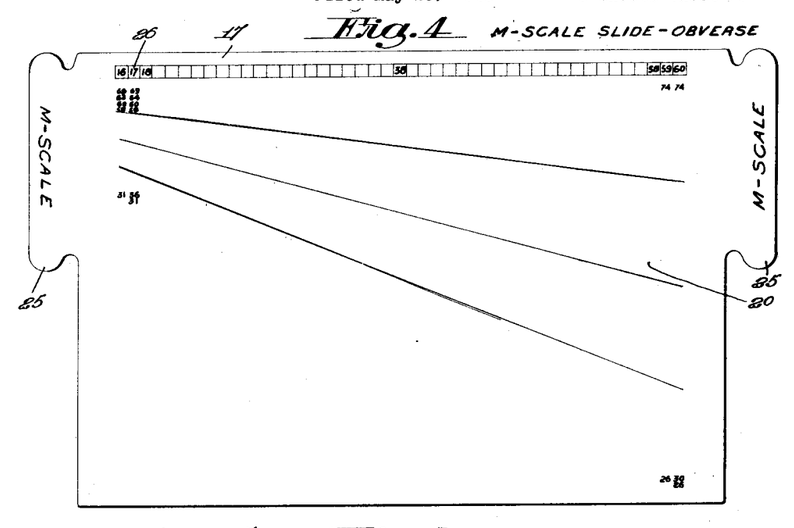
Fig. 4 illustrates the obverse side of the M-scale slide.
Figure 5:
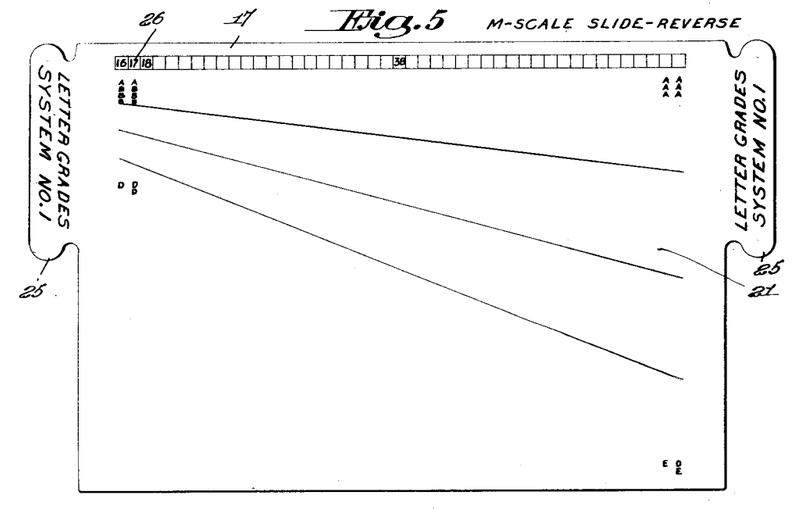
Fig. 5 illustrates the reverse side of the M-scale slide.

Two slides 17, 18 are shown in the drawing. The slide 17 is called an M-scale slide. As a matter of fact, when the obverse side of the slide 17 is in use, it is an M-scale slide, but when the reverse side of the slide 17 is in use it is a letter grade slide, but for convenience of description this slide is called an M-scale slide, having the M-Table 20 printed on the obverse side, and the Letter Grade Table 21 printed on the reverse side.

Figure 6:
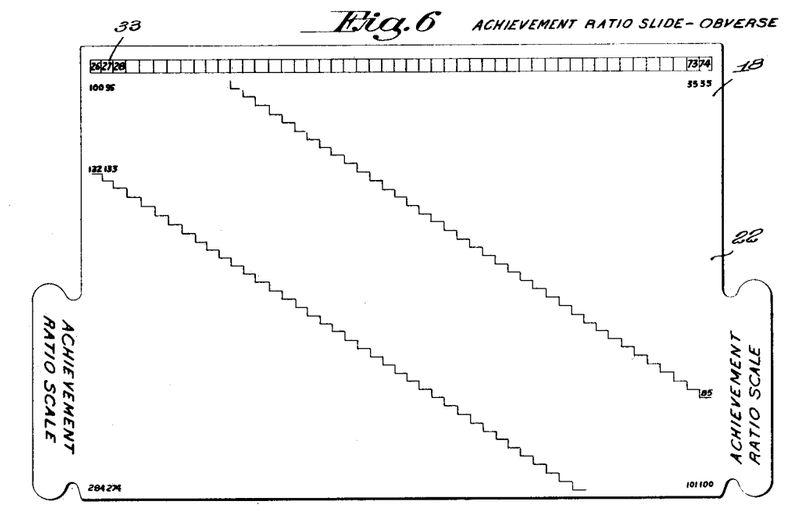
Fig. 6 illustrates the obverse side of the achievement ratio slide.
Figure 7:
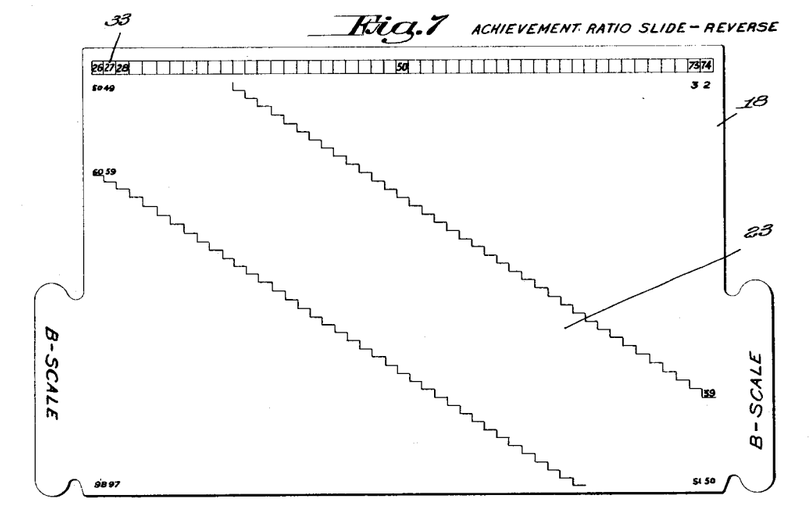
Fig. 7 illustrates the reverse side of the achievement slide.

The achievement ratio slide 18 bears upon its obverse side the Achievement Ratio Table 22, and on its reverse side the Effort or B-scale Score Table 23.

The M-scale slide is provided at each end near the top with tabs 25, which are integral with the slide. On these tabs are printed on the obverse side the word "M-scale," and on the reverse side the words "Letter grades." The obverse side of the slide 17 bears an M-scale Table 20, which consists of a series of columns of percentages, each column being headed by a number designating the number of pupils in the class. The reverse side of the slide has another table, being a Letter Grade Table 21, which consists of a series of columns of letter grades. At the top of the table is a horizontal row of numbers 26, each number of which designates the number of pupils in the class under consideration, by which letter grades of each pupil may be read through the slot 16 when the column headed by the number of pupils in the class is exposed therein. The column headed by the number 38 on the M-scale table has 38 percentages in it, and the column 38 of the letter grade table has 38 letter grades in it. Thus, percentages or letter grades for each pupil may be read directly in the slot, and while these scores do not pretend to correspond to the actual percentages which the pupils got upon the examination or test to which they have been subjected, experience has shown that such percentages do more accurately represent the standing of the pupil with relation to the other pupils than do the actual percentages which were gotten. So also with the letter grades.

Similarly, by using the reverse side of the slide 17 containing the letter grades, the letter grade of each pupil taking the test may be read directly through the slot.

The achievement ratio slide bears at its top a row of standard M-scores from 26 to 74, and on the left hand side of the reverse face 12 of the holder appears at the left hand side of the aperture 16 a column of educational M-scores 31 from 26 to 74. In use, the achievement ratio slide, obverse side up, is put in the holder with its face toward the reverse face 12 thereof, and moved until the standard M-score of the pupil appears opposite the arrow 32. Then by running down the column 31 to the educational M-score of the same pupil there is found in the aperture opposite it the achievement ratio rating. In order to avoid the use of decimals the achievement ratios read in 100 times the actual ratio.

The reverse face of the holder is also used in securing effort scores. This score is found by adding 50 to the M-score of the educational rating, and subtracting the M-score of the mental rating.

The reverse of the achievement ratio slide shown in Fig. 7 might be called the B-scale slide, or the effort scale slide. At the top is provided a row 33 of M-scores of intelligence from 26 to 74, and the columns of the table represent effort scale scores. By inserting this slide in the holder under the reverse face thereof, and sliding it until the M-score of intelligence of a given pupil in the row 33 appears opposite the arrow 32 of the aperture, then by reference to the educational M-score in the column 31 of the reverse face of the holder, the effort score may be read opposite the figure assumed for the pupil. Thus, assume that the pupil had an M-score for intelligence of 38, and an educational M-score of 46; it would be found that his effort score would be 58.

For convenience of ascertaining the quartile of the student in his class, the M-scale Table 20 is provided with diagonal lines dividing it into four parts. In a similar manner the Letter Grade Table 21 is divided. The Achievement Ratio Table 22 is divided into three parts by two stepped diagonal lines, as shown in Fig. 6. When the achievement ratio falls between these lines, the pupil is doing normally, when it falls above the upper line he is doing not so well as he should, and when it falls below the lower line he is doing exceptionally well. Either his stanadrd M-score may be too low, or he may be spending too much time on this subject to the neglect of others.

Similarly, the effort or B-scale is provided with two stepped diagonal lines dividing the Score Table 23 into three parts. When the effort score falls between these lines the pupil is doing normally. If, however, the score falls above the line, he is doing more poorly than he should and the reason should be investigated. When the effort score is below the lower black line, the pupil is doing exceptionally well, and either his standard M-score is too low or he is spending too much time on the subject.

This instrument is intended to be used in connection with a brochure briefly describing the methods employed and the results obtained by its use. It will also explain some of the basic reasoning processes found in "Classroom Tests" upon which the instrument is based.

The several directions printed upon the obverse and reverse faces of the holder are as follows:

*Directions for finding M-scale scores*

1. Place the raw scores from teacher's classroom tests in rank order, best score first, next best score next, etc.
2. Number the best score 1, the next best 2, etc.
3. If there are two or more scores of the same size give each a number. 30,1; 29,2; 29,3; 28,4; 28,5; 28,6; etc.
4. Insert the M-scale slide sheet and draw through until the total number of scores (or the total number of pupils) appears in the small opening opposite the arrow.
5. Read directly each M-score, according to the numbered scores, in the long opening below.

*Cautions*

1. When two or more pupils have the same raw score the M-scores should be averaged for them all.
2. When an average would not be a whole number choose the nearest whole number to 50.

The black lines indicate the quartiles, so that the place of a pupil in the first, second, third or fourth quartile of the class can be easily seen.

*Directions for finding letter-grades*

1. Place the raw scores or M-scores to be graded in rank order, and number the best score 1, the next best 2, etc.
2. Give each score a number even if there are two or more with the same score.
3. Insert the letter-grade scale slide which you wish to use. There are many different forms with different proportions of letter-grades.
4. Draw the slide until the total number of pupils, or scores, appears opposite the arrow.
5. Read directly the letter-grades for each numbered score.

*Cautions*

1. When two or more scores of the same size extend into two score groups (say B and C) give both scores the same grade, (either B or C) as you prefer.
2. If E is considered "failure" give D if the work is the poorest in the class but still above the passing requirement, and E if the work is a failure. No failure should be made mechanically.

The black lines indicate the quartiles, so that the place of a pupil in the first, second, third or fourth quartile can be easily seen.

*Directions for finding achievement ratios*

1. Give a good standard group intelligence or reading test.
2. M-scale the raw scores or the mental ages. Do not use intelligence quotients. This is the standard M-score which each pupil should equal or excel in his school work. It need be found only once for any class.
3. M-scale the raw scores of any classroom test. This is an educational M-score for each pupil.
4. Insert the achievement ratio slide sheet, and draw through until the standard M-score appears in the small aperture opposite the arrow.
5. Find the number in the opening opposite the number indicating the educational M-score. This is the achievement ratio for the pupil.

*Uses*

1. The achievement ratio shows how well a pupil is doing in class work as compared with how well he should do.
2. When the achievement ratio is above the black line the pupil is doing more poorly than he should. Investigate the reasons immediately.
3. When the achievement ratio is below the black line the child is doing exceptionally well. Investigate. His standard M may be too low, or he may be spending proportionally too much time on this subject while neglecting others.

*Directions for finding effort scores*

1. Give a good standard group intelligence or reading test.
2. M-scale the raw scores or mental ages. Do not use intelligence quotients. This gives the standard M which each child should equal or excel in his class work. It need be found only once for any single class.
3. M-scale the raw scores of any classroom test. This gives an educational M-score for each pupil.
4. Insert the effort scale slide sheet and draw through until the standard M-score appears in the opening opposite the arrow.
5. Find the number in the long opening corresponding to the size of the educational M. This is the effort score for that pupil.

*Uses*

1. The effort score shows how well a pupil is doing in class work in comparison with how well he should do.
2. When the effort score is above the black line the pupil is doing more poorly than he should and the reasons should be immediately investigated.
3. When the effort score is below the black line the pupil is doing exceptionally well. Investigate. His standard M may be too low or he may be spending proportionally too much time on the subject.

The Letter Grade Table 20 illustrated in Fig. 4 may be called the Letter Grade System I. It is based on the normal curve and upon the assumption that the scores are divided into five parts, as follows:

A = 3%
B = 23%
C = 48%
D = 23%
E = 3%

In addition to this Letter Grade System I based on the normal curve (see Russell p. 308), other letter grade systems based on the normal curve may be employed, if desired, as follows:

*Letter Grade System II*
A = 4%
B = 24%
C = 44%
D = 24%
E = 4%

*Letter Grade System III*
A = 5%
B = 24%
C = 42%
D = 24%
E = 5%

*Letter Grade System IV*
A = 6%
B = 24%
C = 40%
D = 24%
E = 6%

*Letter Grade System V*
A = 7%
B = 24%
C = 38%
D = 24%
E = 7%

*Letter Grade System VI*
A = 8%
B = 24%
C = 36%
D = 24%
E = 8%

*Letter Grade System VII*
A = 10%
B = 24%
C = 32%
D = 24%
E = 10%

*Letter Grade System VIII*
A = 15%
B = 22%
C = 26%
D = 22%
E = 15%

Besides, eight letter grade systems, numbered IX to XVI may be employed based on minus skew curves, as follows:

*Letter Grade System IX*
A = 3%
B = 22%
C = 54%
D = 20%
E = 1%

*Letter Grade System X*
A = 4%
B = 23%
C = 52%
D = 19%
E = 2%

*Letter Grade System XI*
A = 5%
B = 24%
C = 50%
D = 18%
E = 3%

*Letter Grade System XII*
A = 6%
B = 25%
C = 48%
D = 17%
E = 4%

*Letter Grade System XIII*
A = 7%
B = 26%
C = 46%
D = 16%
E = 5%

*Letter Grade System XIV*
A = 8%
B = 29%
C = 42%
D = 15%
E = 6%

*Letter Grade System XV*
A = 10%
B = 31%
C = 38%
D = 14%
E = 7%

*Letter Grade System XVI*

$$A = 15\%$$
$$B = 32\%$$
$$C = 32\%$$
$$D = 13\%$$
$$E = 8\%$$

All of these slides are adapted to be used with the obverse face of the holder.

The achievement ratio slide bearing the achievement ratios table on the obverse side, and the effort scores or B-scale Table 23 on its reverse side, are used with the obverse face of the holder.

Variations in the form and arrangement of the various elements of the device may be made without departing from the invention, which is defined in the following claims.

I claim:

1. A school class scaling and grading instrument comprising a holder and a slide, the face of the holder being provided with a vertical slot having a column of rank figures alongside of it, a slide within the holder adapted to be moved transversely of the slot provided with a row of column designation figures at the top and columns of figures under each figure of the row, the column designation figures of the slide indicating a certain character of column figures thereunder, and the column of rank figures on the holder alongside the aperture indicating a co-ordinate figure so that by arranging a column of figures of the slide under the slot a column figure thereunder may be read opposite a rank figure on the holder.

2. A scaling and grading instrument having a holder provided with a slideway, a vertically slotted obverse face plate and a vertically slotted reverse face plate, a plurality of slides, some adapted to be used in connection with the obverse face plate and some adapted to be used with the reverse face plate, a column of rank figures alongside the obverse face slot, a column of educational M-score figures alongside the reverse face slot, some slides having tables comprising a plurality of columns of M-scores headed each by a class-size figure indicating the number of pupils in the class, and columns of characters under each class-size number figure giving M-scale characters opposite the rank figures alongside the obverse face slot, and some slides having tables comprising a plurality of columns of achievement ratios headed each by a standard pupil M-score indicating the M-score of a given pupil, the columns of achievement ratios under each pupil M-score giving achievement ratios opposite the educational M-score figures alongside the reverse face slot.

3. A scaling and grading instrument having a holder provided with a slideway, a vertically slotted obverse face plate and a vertically slotted reverse face plate, a plurality of slides, some adapted to be used in connection with the obverse face plate and some adapted to be used with the reverse face plate, a column of rank figures alongside the obverse face slot, a column of educational M-score figures alongside the reverse face slot, some slides having tables comprising a plurality of columns of M-scores headed each by a class-size figure indicating the number of pupils in the class, and columns of characters under each class-size number figure giving M-scale characters opposite the rank figures alongside the obverse face slot, and other slides having tables comprising a plurality of columns of B-scale scores headed each by a standard pupil M-score, indicating the M-score of a given pupil, the columns of B-scale scores under each pupil M-score giving B-scale scores opposite the educational M-score figures alongside the reverse face slot.

4. A scaling and grading instrument having a holder provided with a slideway, a vertically slotted obverse face plate and a vertically slotted reverse face plate, a plurality of slides, some adapted to be used in connection with the obverse face plate and some adapted to be used with the reverse face plate, a column of rank figures alongside the obverse face slot, a column of educational M-score figures alongside the reverse face slot, some slides having tables comprising a plurality of columns of M-scores headed each by a class-size figure indicating the number of pupils in the class, the columns of characters under each class-size number figure giving M-scale characters opposite the rank figures alongside the obverse face slot, some slides having tables comprising a plurality of columns of achievement ratios headed each by a standard pupil M-score indicating the M-score of a given pupil, the columns of achievement ratios under each pupil M-score giving achievement ratios opposite the educational M-score figures alongside the reverse face slot, and other slides having tables comprising a plurality of columns of B-scale scores headed each by a standard pupil M-score, indicating the M-score of a given pupil, the columns of B-scale scores under each pupil M-score giving B-scale scores opposite the educational M-score figures alongside the reverse face slot.

5. A scaling and grading instrument comprising a holder having a face provided with a slot, said holder being provided with a slideway back of the slot, a slide provided with a table of columns of M-scores supported in the slideway and adapted to be slid into position to exhibit any one of the columns of figures on the slide, each column being headed by a designating class-size figure, the face of the holder alongside the slot being provided with a column of co-ordinate rank figures so that for any given M-score column a result M-score figure may be obtained therefrom dependent upon the column designation class-size figure at the top of the column and the co-ordinate rank figure at the side of the slot.

In testimony whereof I have signed my name to this specification.

CHARLES RUSSELL.

CERTIFICATE OF CORRECTION.

Patent No. 1,772,638. Granted August 12, 1930, to

CHARLES RUSSELL.

It is hereby certified that error appears in the printed specification of the above numbered patent requiring correction as follows: Page 1, line 37, for the word "transporting" read transposing; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.